H. DAVISON AND W. R. TOWNSEND.
HEATING AND LIQUEFYING APPARATUS.
APPLICATION FILED MAR. 27, 1919.
1,341,046.
Patented May 25, 1920.
2 SHEETS—SHEET 1.
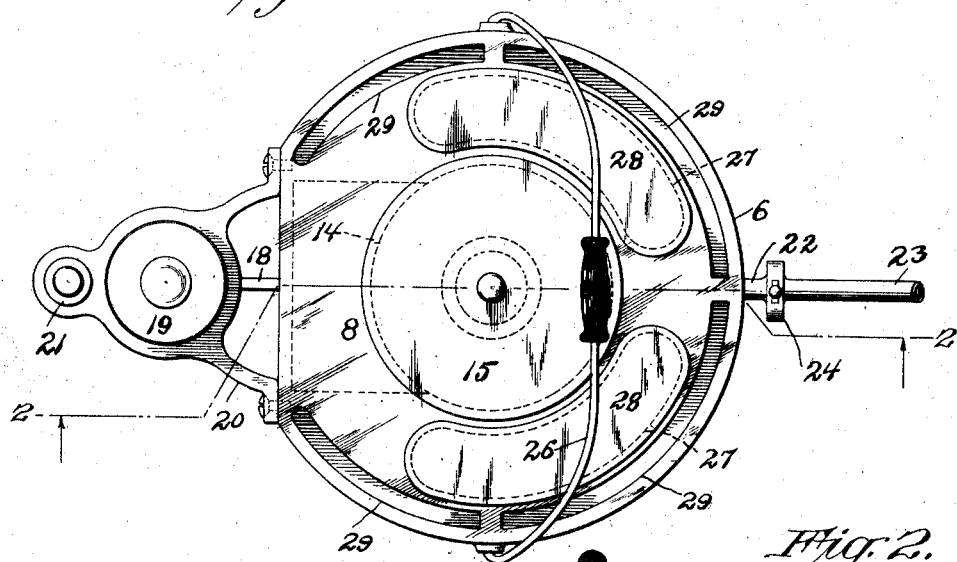
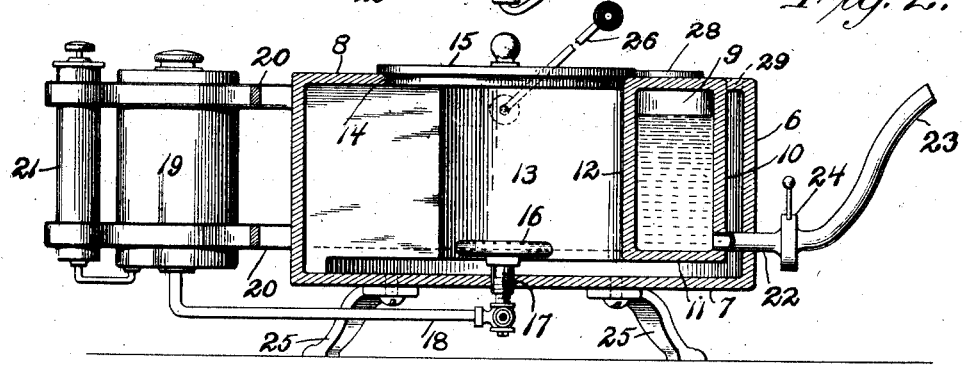
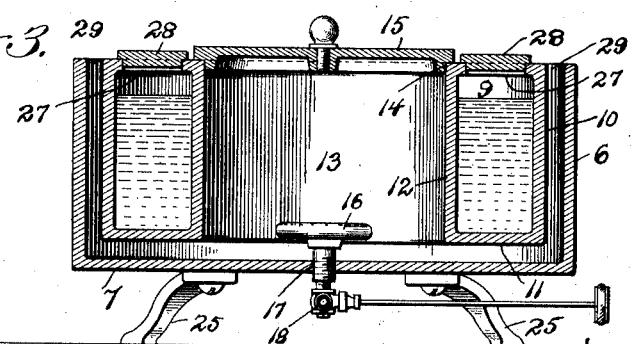
Witness
P. J. Gathmann
Inventors
Harry Davison
William R. Townsend
By
Attorney H. DAVISON AND W. R. TOWNSEND.
HEATING AND LIQUEFYING APPARATUS.
APPLICATION FILED MAR. 27. 1919.

1,341,046.

Patented May 25, 1920.
2 SHEETS—SHEET 2.

UNITED STATES PATENT OFFICE.

HARRY DAVISON AND WILLIAM R. TOWNSEND, OF SHELBYVILLE, INDIANA; SAID TOWNSEND ASSIGNOR TO SAID DAVISON.

HEATING AND LIQUEFYING APPARATUS.

1,341,046.      Specification of Letters Patent.      Patented May 25, 1920.

Application filed March 27, 1919. Serial No. 285,531.

*To all whom it may concern:*

Be it known that we, HARRY DAVISON and WILLIAM R. TOWNSEND, citizens of the United States, residing at Shelbyville, in the county of Shelby and State of Indiana, have invented certain new and useful Improvements in Heating and Liquefying Apparatus, of which the following is a specification.

The present invention relates to material heating means and is peculiarly adapted for liquefying soft metal, such as lead and the like, or for heating water.

The object is to provide a simple self-contained apparatus that is relatively simple, and can be either portable or a permanently fixed heater, and if the latter, it can be easily installed.

Two embodiments of the invention are illustrated in the accompanying drawings, wherein:—

Figure 1 is a top plan view of a metal heating or melting device.

Fig. 2 is a sectional view on the line 2—2 thereof.

Fig. 3 is a sectional view at right angles to Fig. 2.

Similar reference numerals designate corresponding parts in all the figures of the drawings.

Figure 4:
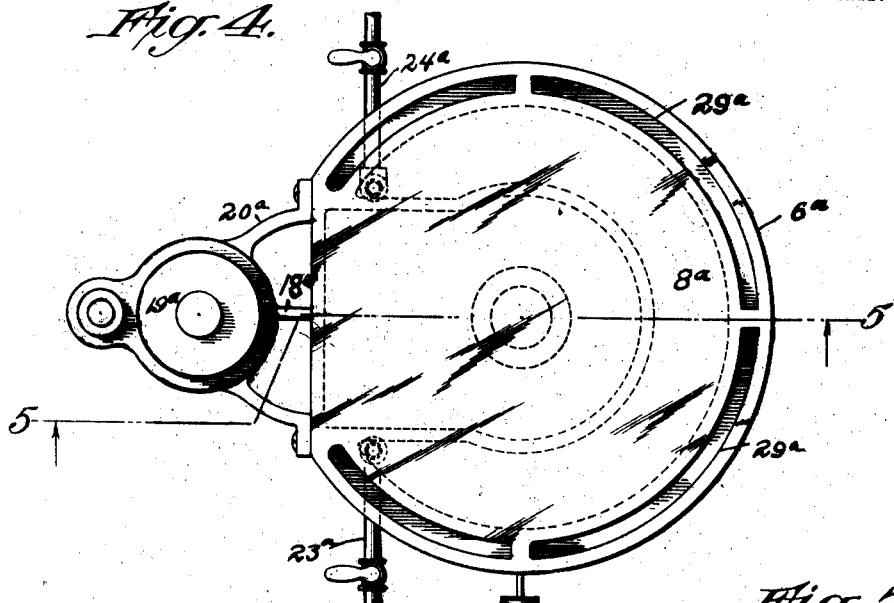
Fig. 4 is a plan view of a modified form of construction, particularly intended as a water heater.

In the embodiment disclosed in Figs. 1, 2 and 3, a substantially cylindrical outer casing is employed, comprising side walls 6, a bottom 7, and a top 8. Suspended from the top is a container 9 for the material to be heated. This container comprises an outer wall 10 spaced from the side walls 6, a bottom 11 spaced from the bottom 7, and an inner wall 12 forming a central chamber 13 having an open bottom, the top opening as shown at 14 to the top of the casing 8. A removable cover or closure 15 is provided for the open top.

A burner 16 of any desirable character is mounted, as shown at 17, in the bottom 7, and delivers the flame and heated products of combustion into the chamber 13. This burner is supplied by a pipe 18 from an upright fuel reservoir 19 mounted by means of brackets 20 on one side of the casing. The brackets also carry a pump 21 by which pressure can be placed upon the fuel in the reservoir 19. Connected with the container 9 is a delivery spout 22 that projects through the casing on the opposite side from the reservoir, this spout having an upturned discharge nozzle 23, and preferably having a suitable controlling gate valve 24 therein. The entire structure is supported on legs 25 carried by the bottom 7 of the casing, and a handle bail 26 is also preferably provided.

Access to the interior of the container 9 is obtained through arcuate openings 27 formed in the top 8 of the casing, which openings may be closed by removable covers 28. Outlets for the products of combustion are provided in said top 8 between the side walls 6 and 10, these outlets, as shown in Fig. 1 being in the form of curved slots 29.

It is believed that the manner of using the device will be clear. Lead or other material to be melted or heated is placed in the container, and the burner is lighted. The flames and heated products of combustion will thus enter the chamber 13 and will flow therefrom beneath the container and upwardly between the side walls 6 and 10, escaping through the slots 29. A very effective heating system is thus provided. When it is desired to deliver the material, it is only necessary to use the handle bail 26 and the reservoir 19 and pump 21 as a handle, whereupon the material can be poured through the spout 23. If it is desired to heat an additional article, the cover 15 can be removed and a kettle or receptacle placed in the opening 14.

Figure 5:
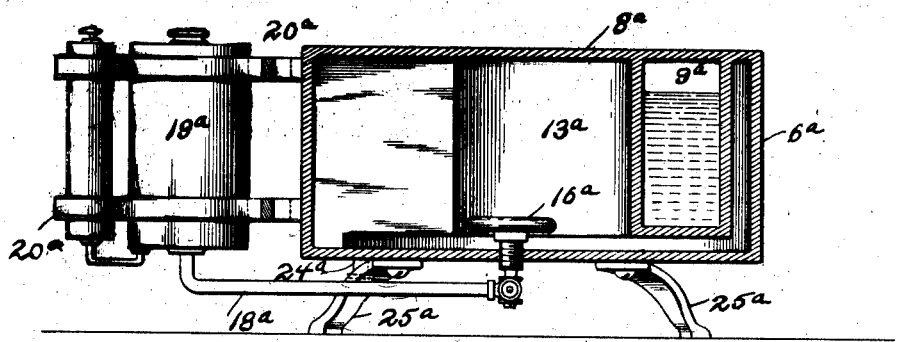
Fig. 5 is a sectional view on the line 5—5 thereof.
Figure 6:
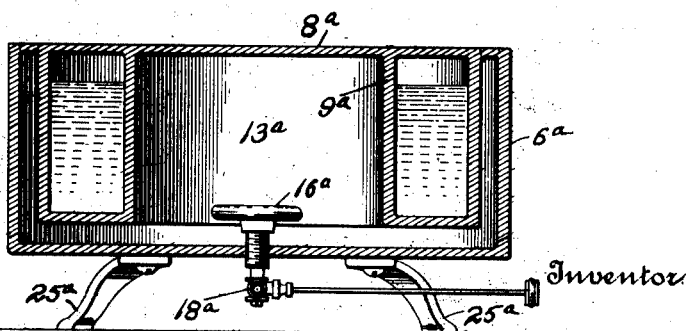
Fig. 6 is a sectional view at right angles to Fig. 5.

The embodiment illustrated in Figs. 4, 5 and 6 is more particularly intended for heating water, though it is not limited to that use. As in the first embodiment, an outer casing $6^a$ is employed, from the top wall $8^a$ of which depends a liquid container $9^a$ having a central chamber $13^a$. A burner $16^a$ delivers to this chamber and is supplied through a pipe $18^a$ from a fuel reservoir $19^a$, carried by one side of the casing through the medium of supporting brackets $20^a$. In this instance the water is supplied to one portion of the container $13^a$ by a pipe $23^{a}$ and the outlet is through a pipe $24^a$ connected with the opposite portion of the container. This device, as in the first described embodiment, is also preferably supported on legs $25^a$. The outlets for the products of combustion, as in the above described structure, is through slots 29ª formed in the top 8ª between the container 9ª and the casing walls 6ª.

It will be obvious that this structure operates in the same manner as that already described.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described our invention, what we claim as new, and desire to secure by Letters Patent, is:—

1. In apparatus of the character described, the combination with a casing, of legs for supporting the same, a container in the casing in spaced relation to the side walls thereof, a burner in the casing, an upright fuel reservoir connected to the casing at one side of the same and in spaced relation thereto, constituting a handle, and an outlet spout from the container projecting through the casing on the opposite side of the fuel reservoir.

2. In apparatus of the character described, the combination with a casing, of a container therein having a central chamber provided with an open bottom, said chamber having a closed connection with the top of the casing, of a burner located to deliver products of combustion into the chamber, and outlet means in the casing for the products of combustion, said outlet means being outside the container and chamber.

3. In apparatus of the character described, the combination with a casing having side walls, of a container in the casing having a central chamber provided with an open bottom and a closed top, said container being spaced from the casing walls, a burner located to deliver products of combustion into the chamber, and outlet means in the upper portion of the casing between the container and casing walls.

4. In apparatus of the character described, the combination with a casing, of a container therein having a central open bottom chamber, means for introducing material into and removing it from the container, said casing having an opening in its top communicating with the chamber, a removable closure for the open top, a burner supplying heat to the chamber, and means in the casing walls outside the container for permitting the escape of the products of combustion from the casing when the closure is in place.

5. In apparatus of the character described, the combination with a casing, of a container therein having side walls spaced from the side walls of the casing, said container having a central chamber provided with an open bottom, said chamber opening through the top of the casing, a removable closure for said top, a burner carried by the bottom of the casing and delivering into the chamber, said casing having outlet openings for the products of combustion outside the container, a fuel reservoir for the burner mounted on one side of the casing, and a delivery spout extending from the lower portion of the container and projecting from the opposite side of the casing to the reservoir.

6. In apparatus of the character described, the combination with a casing having a bottom, side walls and a top, of a container suspended from the top of the casing and located within said casing, said container having a bottom spaced from the bottom of the casing and side walls spaced from the side walls of said casing, said container furthermore having a central chamber provided with an open bottom, said chamber being closed at its upper end from the space within the casing outside the container, a burner carried by the bottom of the casing and delivering into the chamber, a fuel reservoir mounted on the casing and connected to the burner, and outlet means for the products of combustion in the top of the casing between the side walls of the casing and chamber.

7. In apparatus of the character set forth, the combination with a casing having a top, of a container in the casing having an open bottom chamber that opens through the top of the casing, a removable closure for the open top of the chamber, said casing top having an opening permitting access to the container, a burner associated with the chamber for heating the container, and outlet means for the products of combustion opening through the upper marginal portion of the casing outside the container.

In testimony whereof we affix our signatures in the presence of two witnesses.

HARRY DAVISON.
WILLIAM R. TOWNSEND.

Witnesses:
 VERNA JONES,
 CHARLES BEESAR.